(No Model.)
R. MACKIE.
DEVICE FOR SELECTING AND OPERATING MECHANICAL APPARATUS.
No. 507,147. Patented Oct. 24, 1893.
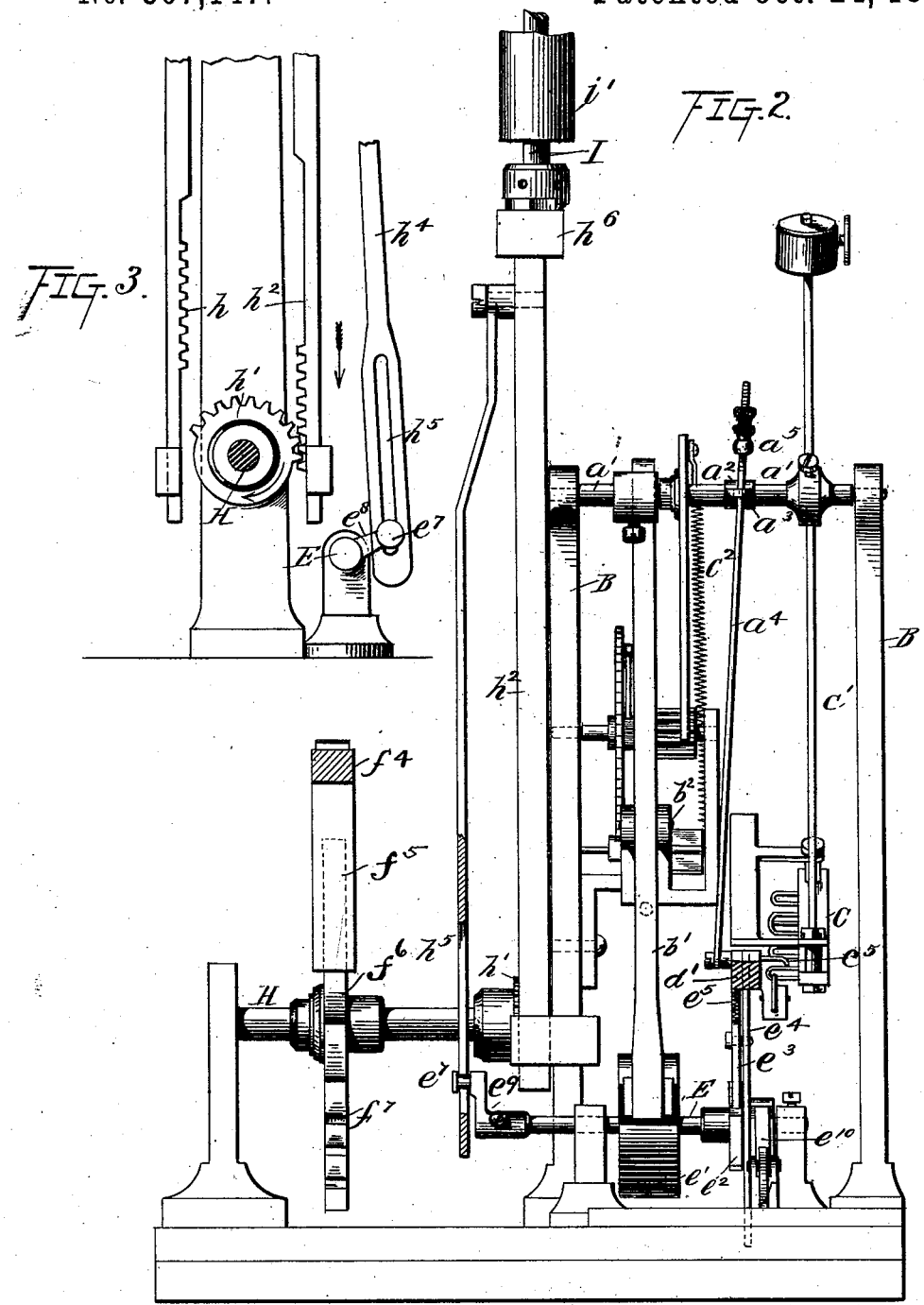

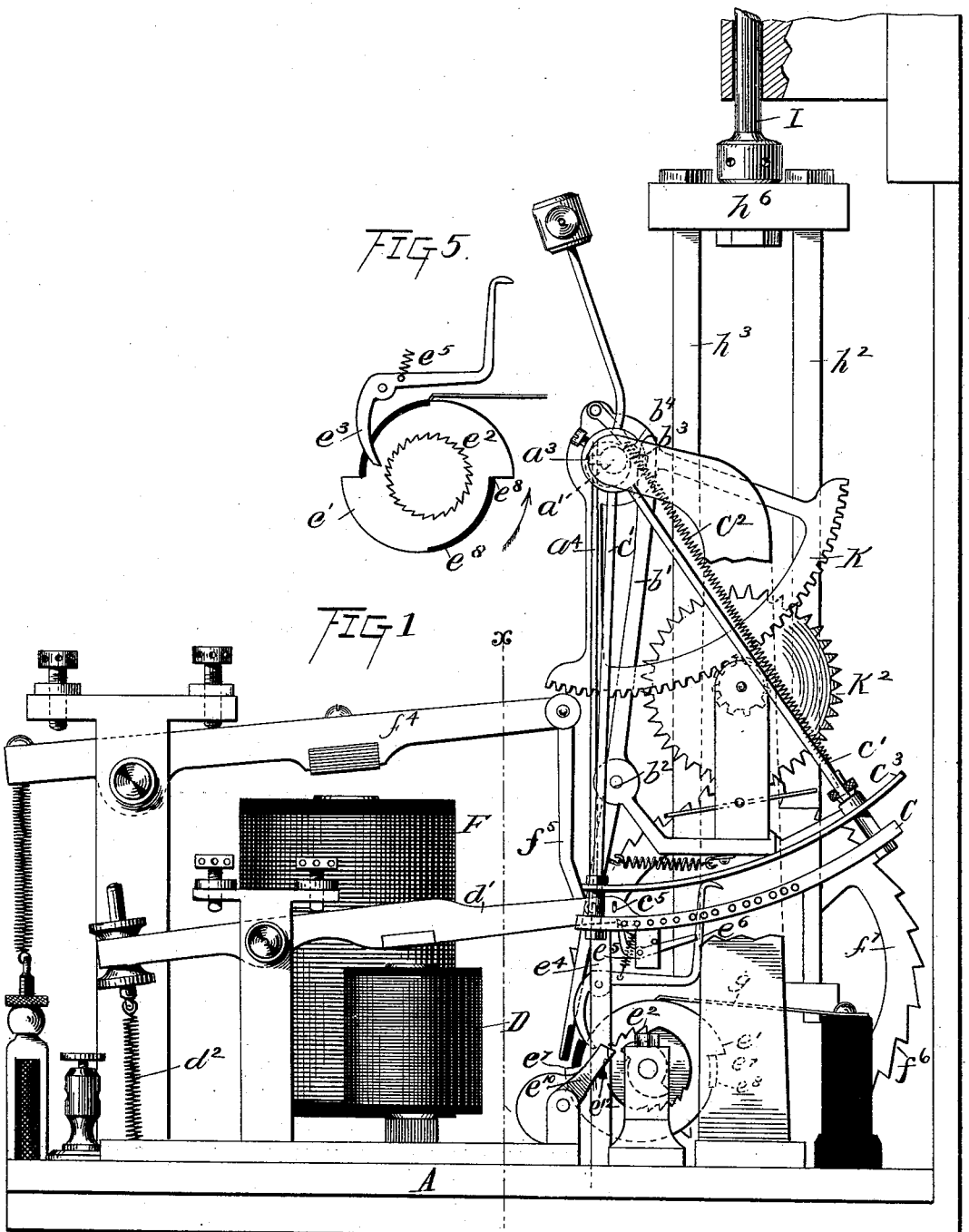

(No Model.) 4 Sheets—Sheet 3.
R. MACKIE.
DEVICE FOR SELECTING AND OPERATING MECHANICAL APPARATUS.
No. 507,147. Patented Oct. 24, 1893.
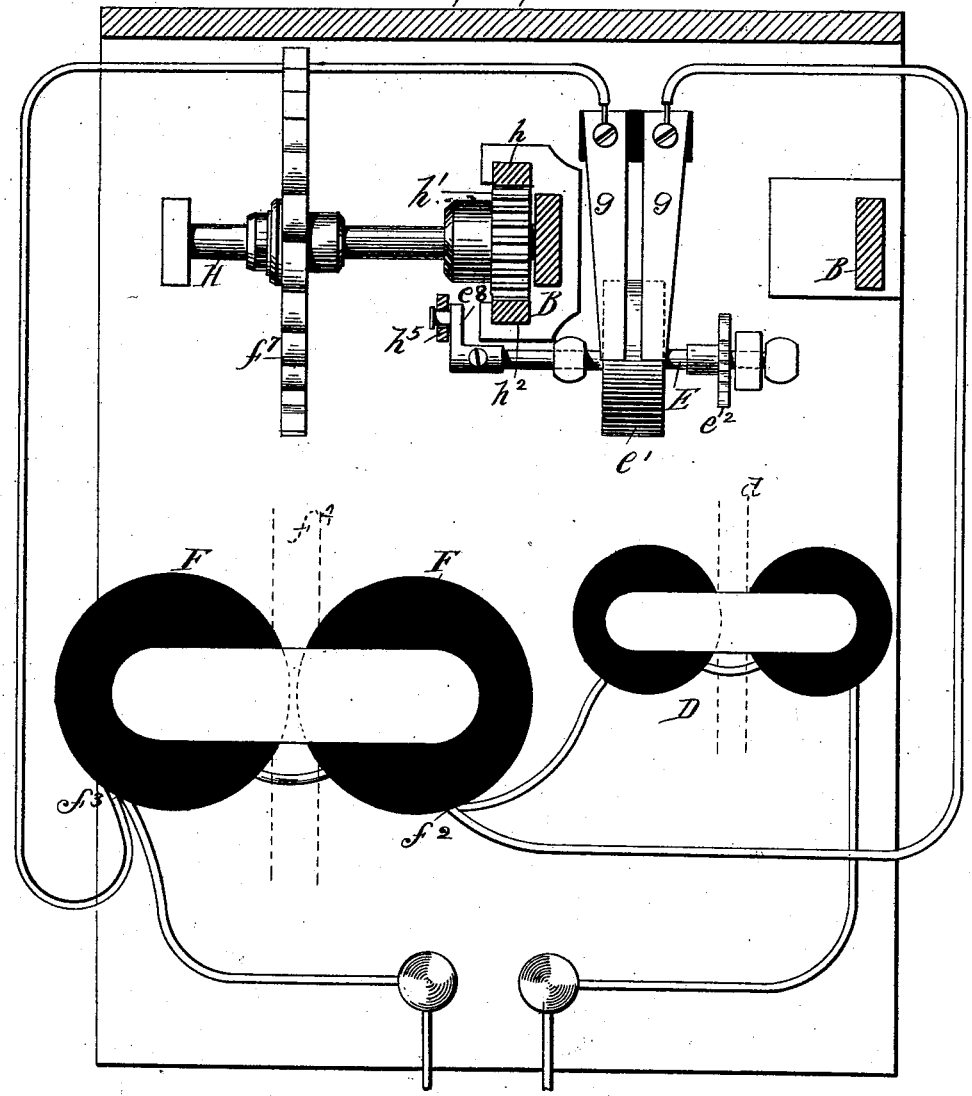
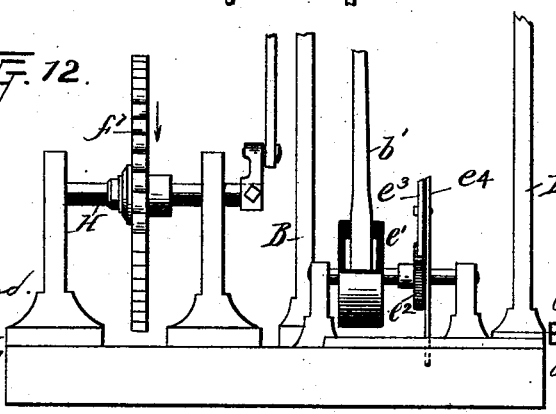
WITNESSES:
Edward O. Rowland.
Frank C. Gammy
INVENTOR
Robt Mackie
BY
Price & Stewart
ATTORNEYS.

(No Model.) 4 Sheets—Sheet 4.
R. MACKIE.
DEVICE FOR SELECTING AND OPERATING MECHANICAL APPARATUS.
No. 507,147. Patented Oct. 24, 1893.
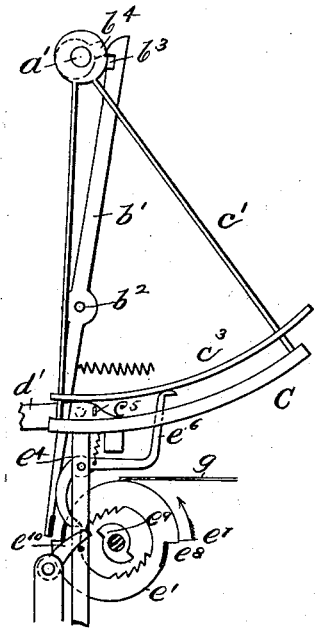
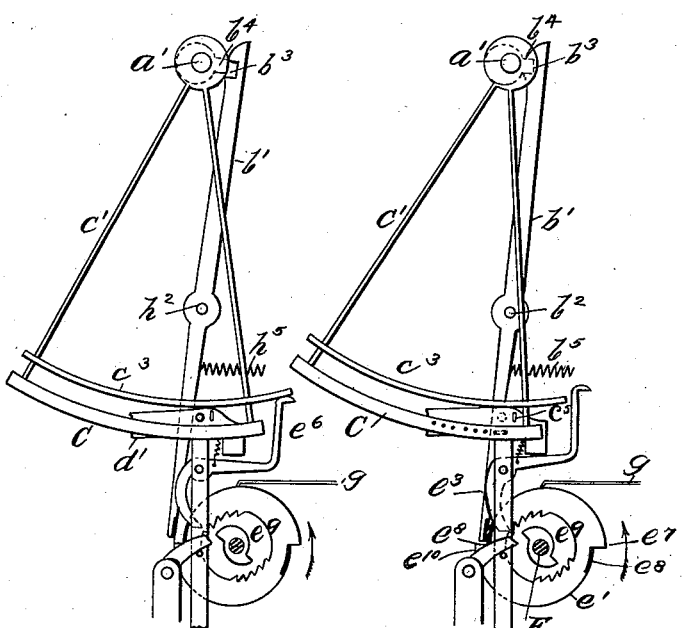
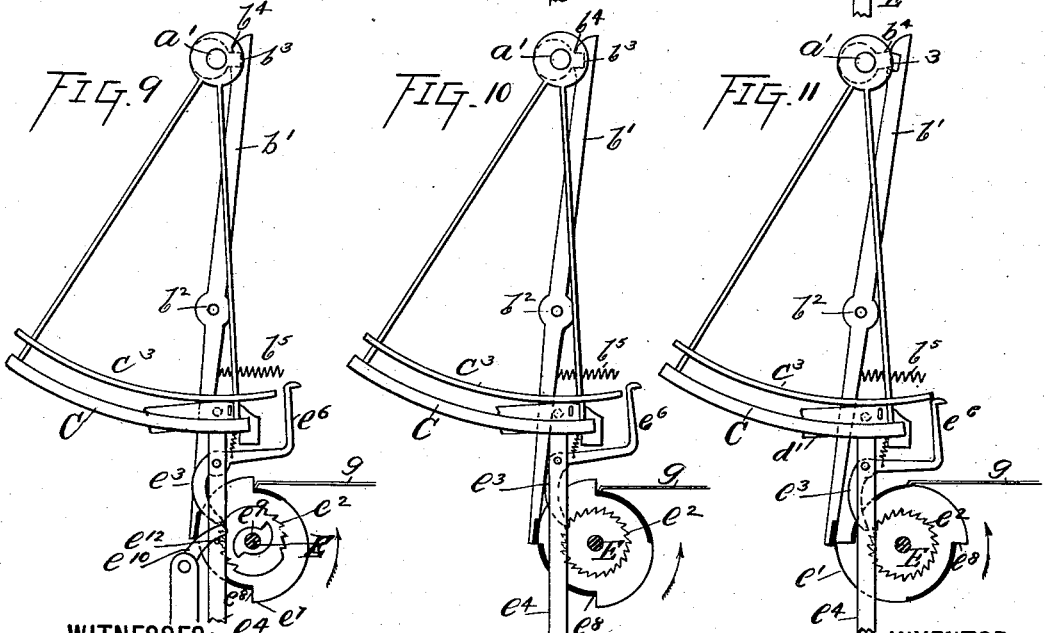
WITNESSES:
Edward Rowland.
Frank C. Garmany.
INVENTOR
Robt Mackie
BY
Price Stuart
ATTORNEYS

UNITED STATES PATENT OFFICE.

ROBB MACKIE, OF CINCINNATI, OHIO, ASSIGNOR, BY MESNE ASSIGNMENTS, TO THE ELECTRIC SELECTOR AND SIGNAL COMPANY, OF WEST VIRGINIA.

DEVICE FOR SELECTING AND OPERATING MECHANICAL APPARATUS.

SPECIFICATION forming part of Letters Patent No. 507,147, dated October 24, 1893.

Application filed July 14, 1891. Serial No. 399,526. (No model.)

*To all whom it may concern:*

Be it known that I, ROBB MACKIE, a citizen of the United States, and a resident of Cincinnati, in the county of Hamilton and State of Ohio, have invented certain new and useful Improvements in Devices for Selecting and Operating Mechanical Apparatus, of which the following is a specification.

The drawings accompanying this specification illustrate the invention, of which—

Figure 1, is a side elevation of the apparatus; Fig. 2, an end view of the same, taken on line $x$, $x$, Fig. 1; Fig. 3, a view of the device for working an ordinary wood arc light cut out; Fig. 4, a view illustrating the course of the electrical currents; Fig. 5, an enlarged view of cylinder, pawl and brush as constructed for working the mechanical devices to the end by electrical impulses. Figs. 6, 7, 8, 9, 10, 11, illustrate view of the positions of sector, cylinder and brushes at different stages of the operation. Fig. 12 is an end view of the lower part of the apparatus showing pawl, sector and cylinder with modified form of an actuating mechanism of the mechanical device to the left.

In a patent granted to Aden A. Hatch for electric signaling apparatus, dated May 14, 1889, No. 403,104, there is shown and described a receiving apparatus adapted to work out a combination of electrical impulses, in which apparatus there are described two sets of electro magnets with their armature levers and means for shunting the current from one set to the other to return the combination sector to its starting point.

My invention has the same general object in view and I am enabled thereby to perform mechanical work by succeeding impulses. This mechanical work as shown and illustrated in the drawings, results in the lighting and extinguishing of a series of electric lamps, but it will readily be seen that it may be used for any other work to which it can be applied.

It will be understood that upon an electric circuit there may be erected a series of electrical lamps, telephones, telegraph instruments or signal stations to each of which there is connected one of the receiving instruments and each receiving instrument is arranged to receive and respond to its own special and particular combination and no other, which combination is usually made by transmitting a series of dots and dashes of the Morse alphabet or its equivalent of dots and intervening spaces. When a series of impulses other than the fixed combination belonging to a selected receiving instrument is transmitted, it generally operates the sector of the receiving instrument a few steps and there it is either stopped or thrown back to the starting point; in such cases the receiving instrument is thus non-operative. But when the receiving instrument receives its entire combination of impulses from the transmitting device, and when these are given, the sector or wheel passes to the limit of its movement and closes a local circuit releasing mechanically operated devices, to ring a bell or perform other similar duty. When the sector has thus passed to the end of its stroke it is usually immediately thrown back to zero, or to its starting point ready to begin work again when required. In connection with such a receiving and transmitting instrument I have placed a mechanical device or apparatus to be operated by the electrical impulses imparted after the receiving instrument has responded and thereby perform mechanical work; this may be done by using the main line circuit or by establishing an independent circuit within which are placed the lamps, telephones, or other devices.

In my invention the sector or wheel of the receiving instrument (though responding as do those heretofore mentioned to a fixed combination of electrical impulses whereby the sector of the receiving instrument is caused to pass through its entire movement), is not immediately returned to its starting point, but is provided with means to stop the sector at the end of its stroke, prevent it from returning back to its starting point, and thus hold it in position to receive other electrical impulses required to operate the mechanical devices connected therewith; and when this is accomplished the last operating impulse to the mechanical device, or an additional impulse given by the transmitter, releases the sector of the receiving instrument and throws it back to its starting point or to zero.

The receiving instrument is constructed upon a suitable base A, provided with the uprights B, which constitutes the frame-work of the apparatus. Suitably journaled in these uprights is the shaft $a'$, and secured to this shaft so as to rotate therewith is the secter C supported by its arms $c'$, which has a normal forward movement from right to left imparted by a spring or weight as $c^2$, or other suitable motor and a backward movement returning it to starting point imparted by the armature lever of the magnet, which will be fully explained.

An electro-magnet D, shown in Fig. 1, receives the impulses from the transmitting instrument and acts upon its armature lever $d'$, attracting it to the pole of the magnet when circuit is closed, and is in turn retracted by spring $d^2$ when opened; thus giving to this lever a movement responsive to the transmitted impulses. A series of these impulses is selected to suit the particular receiving instrument and the impulses thus sent work out the combination upon the sector of the instrument chosen, by means actuated or carried by the armature lever $d'$; for example, the particular sector as shown in Fig. 1 of the drawings, represents the following combination: a dot, a space, two dots, a space, two dots, a space, three dots, a space, a dot, a space, two dots, a space, three dots.

The intervals in the above combination may be said to represent dashes; there are also spaces between which the finger or pin as $c^5$, on the end of the armature lever may pass; as the armature lever is drawn toward the magnet pole it actuates this finger, which acts upon the keys of the combination, impedes its normal progressive movement forward, and holds it until the lever is again lifted, so that the sector takes a fresh start forward with each impulse; at the same time the armature lever is arrested by the keys and is thus prevented from attaining its full stroke; when however, the finger descends through one of the spaces or when the combination is entirely worked out, the armature lever obtains its full stroke and throws the sector back to starting point, in the following manner: Suitably mounted so as to vibrate with the shaft $a'$, is a collar $a^2$; this collar is provided with a projection as $a^3$, which is slotted so that the rod $a^4$, may pass easily through the slot; the lower end of this rod is attached to the armature lever $d'$ and vibrates therewith; its upper end is provided with the shoulder $a^5$, which may be an adjustable nut as shown in the drawings; or the collar and rod may be rigidly connected and the armature lever slotted. As the lever vibrates and its full stroke is impeded by the keys, this rod slides up and down through the slot in the projection $a^3$; but when the armature lever is released and drops upon the magnet pole, the shoulder $a^5$ catches the projection $a^3$, and throws the sector back to the starting point.

It has been said that the armature lever would be left free to return the sector to starting point when the combination has been worked out, and this statement is ordinarily true, but in my apparatus I propose to make use of the mechanism of the receiving instrument to perform mechanical work after the combination is worked out and hence I have provided means for catching and holding the sector; so that it may not be returned to starting point until this work is accomplished. It may be said therefore that in my apparatus the combination is used to set the receiving instrument, to receive other impulses to perform this work and this is done by the following devices: $b'$ is a rod pivoted at $b^2$. Its upper end is provided with a socket as shown at $b^3$. Upon the shaft $a'$, and secured to it or to the hub of the sector, is a projection $b^4$.

Viewing Figs. 1 and 6 the sector is shown at its starting point. The projection $b^4$ is shown to be out of the socket $b^3$ in the arm $b'$; the end of the rod is held against the projection by the spring $b^5$; as the sector moves forward the top of the rod $b'$ is pushed out by the projection $b^4$ until it comes opposite to the socket $b^3$, into which it drops when the sector has reached the end of its forward course, thus holding the sector in position and setting the instrument to receive the additional impulses for the mechanical work; the armature $d'$, does not as yet obtain its full stroke because its stroke is limited by the projection $a^3$ and collar $a^5$, and will not obtain its full stroke until the mechanical movements are given, but it has sufficient movement to do this work which is accomplished by the following means.

Upon a shaft as E, suitably journaled in the frame, I have placed the cylinder $e'$, and on the same shaft E, a ratchet wheel $e^2$, operated by a pawl $e^3$, actuated or carried by the vibrations of the armature lever $d'$, as shown in the drawings. This pawl is pivoted to a rod $e^4$, suspended from the armature lever, and its lower end is normally pressed toward the ratchet by the spring $e^5$. The pawl however, has an arm $e^6$, which projects above its fulcrum, and during the forward movement of the sector the upper end of this arm is in contact with a cross bar $c^3$, secured to the arms of the sector and forms the arc of a circle whose center is the shaft $a'$. When the combination has been worked out, the end of the pawl arm $e^6$, escapes, and allows the pawl to be thrown into engagement with the ratchet about the time the projection $b^4$ has entered the socket $b^3$, and has locked the sector and set the machine for mechanical work. Another set of impulses is now given by the transmitting instrument which operates the armature lever and the pawl $e^3$ to turn the cylinder $e'$ to shunt the current to the coils of another magnet F, which latter may be called an operating magnet as it is intended to perform the mechanical work when the receiving instrument is set and held for this purpose.

Viewing Fig. 1, it will be seen that the cylinder $e'$, is constructed in the form of two semi-cylinders with their faces put together so that the peripheral curve of each will project over the other on one side; thus formed the cylinder shows an abrupt depression as $e^7$, on each side, and this formation answers two purposes, to provide a drop for brushes upon the insulating material $e^8$, and also to furnish the means for throwing out the socket in the end of the arm $b'$, to disengage it at the proper time from the projection $b^4$, and allow the sector to be thrown back to its starting point by the full descent of the armature lever $d'$.

Fig. 4, illustrates the course of the current through the magnets. Supposing the brushes $g$, when the combination impulses begin, to be resting upon the metal surface of the cylinder: the current then starting from the binding posts at the bottom of the figure, is to magnet D, thence to coils of magnet F, at which point I have provided the loop $f^2$. The coils of the magnet F having a greater resistance than the loop, the current proceeds to the first brush $g$, across the metallic surface of the cylinder $e'$, to the other brush $g$, thence to the loop $f^3$, which as in the first instance has less resistance than the coils of the magnet F, and thence to the other binding post. The above is the course of the current during the time the combination impulses are transmitted to set and hold the sector for further impulses. It also follows the same course when the next succeeding impulses are sent to turn the cylinder by means of the pawl and ratchet $e^2$ and $e^3$, and the current is shunted by the brushes $g$, dropping upon the insulating material $e^8$; in this position the current cannot jump from one brush $g$ to the other, and consequently it takes the following course: from the binding post to coils of magnet D, thence through coils of magnet F, thence to the other binding post; it has thus required a series of combination impulses to operate the receiving instrument, set and hold its sector, and then another series of impulses to shunt the current to an operative magnet to perform mechanical work, and when this is done the current is now through both of the magnets D and F, and the impulses thus sent may be said to have set the instrument to receive other impulses to do the mechanical work required and return the receiver to its starting point.

The mechanical work may be of any character required but I have shown and illustrated in the drawings the instrument known as the Wood cut-out for arc electric lamps.

The magnet F is provided with an armature lever $f^4$, and the usual spring for returning it when the current is opened. On the end of this armature lever is hung the pawl $f^5$ which reciprocates with the lever and engages with the ratchets $f^6$ on the wheel $f^7$, so that the impulses transmitted when the magnet F is in circuit turn this wheel.

In a suitable frame the shaft H is journaled to which the ratchet wheel $f^7$ is secured, and on the same shaft is placed the cog wheel $h'$, so that this wheel is turned with the shaft. The bars $h^2$, $h^3$, are provided with teeth to mesh with the teeth of the cog wheel $h'$, and pivoted to the bar $h^2$ is the connecting rod $h^4$; the lower end of this rod is provided with a slot as $h^5$, within which plays the crank pin $e^7$, whose crank $e^8$ is attached to the shaft E: it will be noticed that as the connecting rod travels up or down there is a lost motion given by this slot and the connecting rod does not act upon the shaft E to turn it until the crank pin touches either the top or bottom of this slot; the upper ends of the bars $h^2$ $h^3$, are joined by the cross beam $h^6$, and projecting above this is the rod I, suitably guided as in the bracket $i'$; the rod I is broken away. It is intended to be connected with a mechanical device such as the Wood arc light cut-out, the construction of which is well known and need not be described further than to say that such devices ordinarily have a reciprocating movement impelled by hand or suitable power for a certain distance, and the instrument then makes a sudden jump the rest of the distance, and this occurs in both directions whether in lighting or extinguishing a lamp; it will therefore be seen that the ratchets $e^2$, on the wheel $e'$ and the cogs on the wheel $h'$, co-operate together and with the slot in the connecting rod $h^4$, to provide for the effect of the jump in the cut-out device. When the current is shunted as above described, the ratchet wheel $f^7$, is turned by the armature lever $f^4$ and its pawl: let us suppose that the shaft H is thus turned in the direction until the upper end of the slot in the connecting rod $b^4$, is about to contact with the crank pin $e^7$; when this occurs the bar $b^3$ has also been lowered, its rack passing by the open space between the end of the teeth on the wheel $h'$; while this is proceeding, the cylinder $e'$ is standing still, because the pawl $e^3$ had passed to the end of the ratchets on the wheel $e^2$, when the shunting of the current was completed. The jump of the cut-out instrument now occurs, which brings down the arms $h^2$, $h^3$, still further turning the wheel $h'$ until it presents its first tooth in position to mesh with the upper tooth of the bar $h^3$, and thus prepares it to impel the bars in the opposite direction when required; at the same time the connecting rod has turned the crank $e^8$, which accomplishes two results, viz: The cylinder $e'$ has been turned about one quarter of a revolution, returning the brushes $g$, to the conducting part of the cylinder $e'$, thus cutting out the magnet F. The projection $e^7$, on the cylinder has thrown out the lower end of the bar $b'$, releasing its socket from the projection $b^4$, thus setting free the sector and allowing the armature lever $d'$ to attain its full stroke to throw the sector back to its starting point. The instrument is now ready to begin over again and receive its several series of impulses, to work its combination, shunt the current, operate mechanical devices and return to its starting point. The different positions of the parts while this work is performed are shown in diagrams, Figs. 6, 7, 8, 9.

As already described the position of the sector at the starting point is that shown in Fig. 6. At this point the impulses begin to work out the combination; in Fig. 7, the combination is nearly completed and the projection on the shaft $a'$, is about to fall into the socket in the end of the locking-arm, the upper end of the arm of the pawl lever is about to be released by passing the end of the sector, and the position of the cylinder is such as to present the depression $e^8$ to the lower end of the locking arm so that it may have room to retreat and to allow the socket $b^3$ to fall over the projection $b^4$. In Fig. 8, the socket in the end of the arm has caught the projection $b^4$, the arm $e^6$ of the pawl has passed the end of the sector, the pawl has entered into contact with the ratchet $e^2$ and the apparatus is now ready to receive the impulses for shunting the current and when these are given, the brushes $g$, drop upon the insulating material as shown in Fig. 9, and the current is now through both magnets.

Upon the cylinder $e'$, I have placed the catch $e^9$, and have combined therewith the stop $e^{10}$, which is lifted from the catch by the pin $e^{12}$, in the pawl rod $e^4$, which lifts the stop from the catch $e^9$, when the pawl and ratchet are working and drops into the catch to hold the cylinder steady during the jump of the cut-out device, and prevent the jump from throwing it too far.

Having now described the construction of the apparatus and the method of operating it in connection with the jump of a Wood cut-out, I will now describe means for operating mechanical devices to the end by use of electrical impulses.

Figs. 10 and 11, illustrate means which may be employed to work out mechanical movements by impulses to the end; it will be seen from these figures that the ratchet is an entire circle; the movements in working out the combination are the same as those already described, and when the impulses begin for shunting the current, the brushes $g$ are in the position shown in Fig. 11; when completed they drop upon the insulating material as shown in Fig. 10; it will be seen also from these figures that the insulating material is extended around the surface of the cylinder in order that the current may remain shunted until the mechanical work is completed, and when this is done an additional impulse or two will cause the projection $e^7$ to release the sector and permit the full throw of the magnet to return it to starting point. On the shaft E, I place a crank which attains its full upward throw when the mechanical impulses are completed for doing a special work and its full downward throw for the mechanical work when again put to use for this purpose.

The cogged segment K, pinion $k'$, and ratchet $k^2$, illustrate parts of the retarding device, which may be used with a pendulum escapement, or a dash-pot may be substituted or any other of the well known means for retarding may be used to steady and regulate the forward progressive movement of the sector and need not be further described.

I do not wish to confine myself to the specific devices employed in the operative parts of this instrument. For example when the phase of the receiving instrument is completed, a mechanic could devise a number of means for locking the receiving instrument and unlocking the same, other than those specifically shown and described. The device shown in this application is simply to illustrate one practical way of doing this work leaving it to the skill of a mechanic to devise other and modified forms. Again the current need not be shunted to the coils of the operating magnet in the manner herein described as any electrical expert may in his discretion adopt other means for this purpose. The order of operating the parts of the device may also be reversed. For example, the spring or weight for imparting the progressive forward movement to the sector, may be substituted by a magnet and the spring be used for the reverse movement, or two magnets may be used, one for the forward and the other for the reverse movement without changing the invention. Nor do I wish to limit my invention to the shunting of the current to and from the second pair of magnets, as it is evident that wherever necessary the operating magnet may be placed in a local circuit which can be opened and closed by the revolution of the cylinder in the same manner as its operation is already shown in the description and drawings.

I believe I am the first to conceive and carry out in a practical apparatus the working of a combination instrument by electrical impulses, then locking and holding the same in position to receive other impulses and performing mechanical work with these impulses, and also to return the instrument to starting point when this work is completed and thus prepared to be again operated by transmitting the same series of impulses; and such inventions I wish to claim.

What I claim, and desire to secure by Letters Patent, is—

1. In a selecting system, a receiving instrument adapted to respond to a fixed combination of electrical impulses in circuit with an impulse transmitting instrument in combination with locking means for locking the receiving instrument to prepare it for future electrical impulses means for shunting the current to an operating magnet, mechanical devices and means for operating the same by impulses of the transmitting instrument through the coils of the operating magnet.

2. The combination with an electrical impulse transmitting instrument of a mechanical apparatus advanced into position by an operating magnet responding to an impulse or impulses from said transmitter, a selecting or preparing instrument controlled by a magnet responding to a predetermined arrangement of electrical impulses and thereby bringing the coils of the magnet of the mechanical device with which the receiving instrument is connected and no other into circuit with the transmitting instrument.

3. The combination with an electrical impulse transmitting instrument of a mechanical apparatus advanced into position by an operating magnet responding to an impulse or impulses from said transmitter, a selecting or preparing instrument controlled by a magnet responding to a predetermined arrangement of electrical impulses, and means operated by the receiving instrument to shunt the current to the coils of the operating magnet of the mechanical device with which said instrument is connected.

4. The combination with an electrical impulse transmitting instrument of a mechanical apparatus advanced into position by an operating magnet responding to an impulse or impulses from said transmitter, a selecting or preparing instrument controlled by another magnet responding to a predetermined arrangement of impulses and thereby bringing the operating magnet of the mechanical device with which the selecting instrument is connected and no other into circuit with the transmitter and devices responding to an additional impulse or impulses from the same transmitter to restore the selecting instrument to normal position.

5. In an electric selecting apparatus, an impulse transmitting instrument in circuit with an impulse receiving instrument adapted to respond to a fixed combination of electrical impulses to complete its phase, the receiving instrument provided with two magnets and their armature levers, one to receive the combination impulses and operate the receiving instrument to the completion of its phase and lock it in position to receive other impulses and the other to perform mechanical work actuated by impulses from the transmitting instrument in combination with means for shunting the current to the coils of the latter magnet.

6. In an electric selecting apparatus, an impulse transmitting instrument in circuit with an impulse receiving instrument adapted to respond to a fixed combination of electrical impulses to complete its phase, the receiving instrument provided with two magnets and their armature levers, one for working out the combination, and the other for performing mechanical work, in combination with means operated by the armature lever of the first magnet for locking and holding the receiving instrument when its phase is completed, means for shunting the current to the operating magnet, means for performing mechanical work operated by the latter and means for restoring the receiving instrument to its starting point when the mechanical work is completed.

Signed at Cincinnati, in the county of Hamilton and State of Ohio, this 30th day of June, A. D. 1891.

ROBB MACKIE.

Witnesses:
J. D. MEEKER,
LOUIS A. BROWNBECK.